(12) United States Patent
Kerger et al.

(10) Patent No.: US 6,956,363 B2
(45) Date of Patent: Oct. 18, 2005

(54) DIFFERENTIAL PROTECTION METHOD FOR PRODUCING A FAULT SIGNAL CHARACTERISTIC OF A FAULT

(75) Inventors: Torsten Kerger, Berlin (DE); Yves Ngounou Ngambo, Luik (BE); Luc Philippot, Berlin (DE)

(73) Assignee: Siemens Aktiengesellscaft, Munich (DE)

( * ) Notice: Subject to any disclaimer, the term of this patent is extended or adjusted under 35 U.S.C. 154(b) by 18 days.

(21) Appl. No.: 10/149,074

(22) PCT Filed: Dec. 5, 2000

(86) PCT No.: PCT/DE00/04382

§ 371 (c)(1),
(2), (4) Date: Oct. 28, 2002

(87) PCT Pub. No.: WO01/43256

PCT Pub. Date: Jun. 14, 2001

(65) Prior Publication Data

US 2003/0076112 A1 Apr. 24, 2003

(30) Foreign Application Priority Data

Dec. 7, 1999 (DE) .......................................... 199 59 776

(51) Int. Cl.$^7$ .............................................. G01R 31/00
(52) U.S. Cl. .................... 324/117 R; 324/126; 324/127
(58) Field of Search .......................... 324/117 R–117 H, 324/522, 126–127, 133; 361/91–94; 340/870.17; 702/64

(56) References Cited

U.S. PATENT DOCUMENTS

| 4,939,617 | A |   | 7/1990  | Hoffman et al. |
| 5,077,520 | A | * | 12/1991 | Schweitzer, Jr. ............ 324/133 |
| 5,206,596 | A | * | 4/1993  | Beihoff et al. .............. 324/536 |
| 5,565,783 | A | * | 10/1996 | Lau et al. .................... 324/522 |

OTHER PUBLICATIONS

Leonard J. Ernst et al., "Charge Comparison Protection of Transmission Lines—Relaying Concepts"; IEEE Transactions on Power Delivery, vol. 7, No. 4, Oct. 1992.

* cited by examiner

Primary Examiner—Vinh P. Nguyen
(74) Attorney, Agent, or Firm—Morrison & Foerster LLP

(57) ABSTRACT

The invention relates to a method for generating an error signal which characterizes a fault current in an electrical conductor provided with two conductor ends and having charge measuring devices which are connected to each other by data lines. At least one device is attached to each end of the conductor. In the invention, charge measuring values are determined using charge measuring devices. The measured charge values take into account the direction of the charge flow and a total measured charge value is formed by addition. The error signal is generated when the total measured charge value exceeds a certain threshold value. In order to be able to detect errors in a more sensitive manner than had previously been possible, the threshold value is formed by taking into account the individual measuring tolerance of the individual charge measuring devices.

6 Claims, 2 Drawing Sheets

DIFFERENTIAL PROTECTION METHOD FOR PRODUCING A FAULT SIGNAL CHARACTERISTIC OF A FAULT

CLAIM OF PRIORITY

This is a U.S. national stage of PCT/DE00/04382 filed 5 Dec. 2000 which claims priority to German application 19959776.6 filed 7 Dec. 1999 published on Jun. 14, 2001.

TECHNICAL FIELD OF THE INVENTION

The invention relates to a method for producing a fault signal, and in particular, to a fault signal characteristic of a fault current in an electrical conductor having at least two conductor ends.

BACKGROUND OF THE INVENTION

"Charge comparison protection of transmission lines—relaying concepts" (Ernst, Hinman, Quam, Thorp; IEEE Transaction on Power Delivery, Vol. 7, No. 4, October 1992, pages 1834 to 1846) discloses a method of providing a fault signal. In this method, the respective current at each conductor end of a conductor is sampled forming current samples. The samples are in this case recorded at a time interval of 0.5 ms. The samples obtained in this case are integrated on a conductor-end specific basis to form charge measurement values, with the integration duration corresponding to half the period duration of the current—the method relates to an alternating current with a fundamental frequency of 60 Hz. The integration intervals in this case always start and end at zero crossings of the alternating current. The charge measurement values formed in this way are added up, to be precise firstly to form a scalar sum (sum of absolute magnitudes) by adding up the charge measurement values without taking into account the respective mathematical signs—that is to say without taking account of the charge flow—and secondly to form an arithmetic sum (absolute magnitude of the sum of the signed magnitudes)—referred to in the following text here as the overall charge measurement value—by adding up the charge measurement values taking into account the respective mathematical signs. The fault signal is produced when the overall charge measurement value (arithmetic sum) exceeds a threshold value which is dependent on the scalar sum, that is to say a threshold value which is matched to the respective measurement situation.

U.S. Pat. No. 4,939,617 also discloses producing a fault singal. In this method, a fault signal is produced when an internal fault occurs on a power transmission line. For this purpose, current measurement values are recorded at each of the two ends of the conductor and are integrated over a time period of one half cycle. The charge measurement values recorded in this way are transmitted via a communication line between the charge measurement appliances in both directions from the first charge measurement appliance to the second charge measurement appliance and vice versa.

A restraint value is in each case formed in evaluation devices which are associated with the respective measurement appliances, as the sum of the charge measurement value from the first measurement appliance and of the charge measurement value from the second measurement appliance, by adding the measurement values without taking account of their respective mathematical signs. Furthermore, a comparison value (operate value) is formed as a sum by addition of the two charge measurement values with the correct mathematical signs. This comparison value is multiplied by a factor, for example 3, forming a weighted comparison value. A fault signal which indicates an internal fault on the power transmission line is produced if the comparison value assumes a value which is greater than the restraint value.

SUMMARY OF THE INVENTION

The invention relates to a method for producing a fault signal which characterizes a fault current in an electrical conductor having at least two conductor ends, with charge measurement devices which are connected to one another via data lines and of which one is in each case fitted to each conductor end of the conductor with, in the case of the method, the charge measurement devices being used to measure charge measurement values which each indicate the amount of charge which has flowed through the respective conductor end during a predetermined measurement duration, the charge measurement values being used to form an overall charge measurement value, taking account of the direction of the charge flow by addition, and the fault signal being produced if the magnitude of the overall charge measurement value exceeds a threshold value which is set as a function of the respective magnitude of the underlying current.

In one embodiment of the invention, a threshold value is formed taking into account the individual measurement tolerance of the individual charge measurement devices.

One advantage of the invention is that it allows errors to be identified in a particularly sensitive manner. In another embodiment, the invention, the threshold value is formed taking into account the individual measurement tolerance of the individual charge measurement devices. Specifically, with the method according to the invention, this makes it possible to take into account, for example, a situation where a charge measurement device which operates very inaccurately measures a very high charge measurement value and thus necessarily also produces a particularly large measurement error. This is because the method according to the invention takes account of the individual measurement tolerance of each charge measurement device.

In one aspect of the invention, the charge measurement devices are used to measure the current flowing through the respective conductor ends, and the charge measurement values are formed by analog or digital integration of the current measurement values formed in this case, over the measurement duration. Hence, the charge measurement values are formed by integration of current measurement values, which specifically makes it possible to use conventional current measurement devices to form the charge measurement values.

With this embodiment of the invention, the individual measurement tolerance of the individual charge measurement devices can be taken into account in a particularly simple and hence advantageous manner if the respective maximum current measurement value within the measurement duration is determined for each conductor end, the maximum current measurement values are each multiplied by a measurement duration value which indicates the measurement duration, in order to form fictional instantaneous maximum charge measurement values, the magnitudes of the maximum charge measurement values are each weighted with the individual measurement tolerance of the respective charge measurement device and are added up to form an overall measurement error, and the threshold value is chosen such that it is at least as great as the overall measurement error, and the threshold value is chosen such that it is at least as great as the overall current measurement error. Thus, in this embodiment, τ the individual measurement tolerance of the individual charge measurement devices is taken into account with particular attention to fictional instantaneous maximum charge measurement values, thus particularly reliably avoiding incorrect production of the fault signal.

As described above, the invention provides that the charge measurement values are formed by integration of current measurement values. With this, the fault signal can be produced particularly reliably if the integration error which occurs due to the integration of the current measurement values is added up in each of the charge measurement devices, the resultant overall integration error is added to the overall current measurement error to form an overall measurement error, and the threshold value is chosen such that it is at least as great as the overall measurement error. This is because this refinement of the method according to the invention takes account not only of the individual measurement tolerance of the charge measurement device but also of the integration error in the integration of the current measurement values.

It is advantageous for the synchronization error to be taken into account in the formation of the charge measurement values. It is thus preferable that the maximum synchronization error which occurs due to faulty synchronization of the charge measurement devices is determined, the resultant synchronization error is added to the overall measurement error to form an overall system error, and the threshold value is chosen such that it is always at least as great as the overall system error.

In order to ensure that incorrect production of the fault signal is avoided even when the overall charge measurement values are very small, it is preferable for the fault signal to be produced if the overall charge measurement value exceeds a fixed predetermined minimum threshold value and exceeds the overall system error. This is because the invention avoids the fault signal being produced when very small current and/or charge measurement values are present overall.

It is also advantageous for the measurement of the charge measurement values to be repeated regularly such that the time interval between two respectively successive measurements is shorter than the predetermined measurement duration. One advantage of the invention is that it can be used to identify errors. This is because, in contrast to the known method described initially, the measurements of the charge measurement values are not carried out separately and successively, but overlapping in time. Specifically, this means that considerably more charge measurement values are recorded in each period so that an even greater "database" is available for error identification than in the past. This will be explained using a numerical example: in the known method, the charge measurement values are always formed with respect to half the period length so that—in each period—there are a maximum of two charge measurement values available for evaluation for each conductor end. In contrast to this, in the case of the method according to the invention, the charge measurement values are formed using measurement windows which overlap in time, as a result of which virtually any desired number of charge measurement values can be formed depending on the extent of the predetermined overlap. Overall this leads to a larger amount of data or to a database which can be evaluated, and hence to greater reliability in the formation of the fault signal.

If the charge measurement values are formed by integration of current measurement variables (in analog or digital form) which have been produced using current transformers, then measurement errors can occur due to current transformer saturation. In order to avoid measurement errors due to current transformer saturation, it is advantageous for the predetermined measurement duration—that is to say the measurement window for the measurement of the amounts of charge—to be considerably shorter than half the period duration of the current, in order that, if necessary, the error signal can be produced before the current transformers become saturated. In one aspect of the invention, the predetermined measurement duration correspond to approximately one quarter of the period duration of the current. This is because a measurement window length such as this is long enough to obtain charge measurement values which can be assessed well, while being short enough to allow the measurement signal to be produced reliably before the onset of current transformer saturation.

It is preferable for carrying out the invention for the time interval between two measurements which partially overlap in time to be approximately half as great as the predetermined measurement duration (with the measurement window being of the same length). This means that approximately 8 charge measurement values are produced for each period with a measurement window length which corresponds to one quarter of the period duration of the current, which means that in general, sufficient reliability is achieved in the formation of the fault signal.

If the overall charge measurement value is formed in one of the charge measurement devices, advantageous if, in the case of a conductor having at least three conductor ends, an intermediate value which is formed by addition in advance from the charge measurement values of the other charge measurement devices is transmitted to a selected charge measurement device, and the overall charge measurement value is formed by addition from the charge measurement value of the selected charge measurement device and the intermediate value. This is because the development saves data rate since there is no need to transmit the charge measurement values of all the other charge measurement devices—i.e., a large number of measurement values—to the selected charge measurement device, but rather a single measurement value, namely the intermediate value.

Alternatively, it is advantageous if, in the case of a conductor having at least three conductor ends, two intermediate values are transmitted to the selected charge measurement device. Specifically, a first, which is formed by addition from the charge measurement values of a first group of the other charge measurement devices, and a second intermediate value, which is formed by addition from the charge measurement values of a second group of the other charge measurement devices, with the second group containing all the charge measurement devices apart from the selected charge measurement device and the charge measurement devices in the first group, the overall charge measurement value being formed by addition from the charge measurement value of the selected charge measurement device and the two intermediate values. This alternative can be used particularly advantageously if the charge measurement devices are connected to one another to form a "chain" in order to interchange data on data lines, and if the selected charge measurement device is an inner chain link in this chain formed in this way.

The principle of "intermediate value formation" can also advantageously be transferred in a corresponding manner to the measurement errors of the charge measurement devices.

BRIEF DESCRIPTION OF THE DRAWINGS

In order to explain the invention.

DETAILED DESCRIPTION OF THE PREFERRED EMBODIMENT

Figure 1:
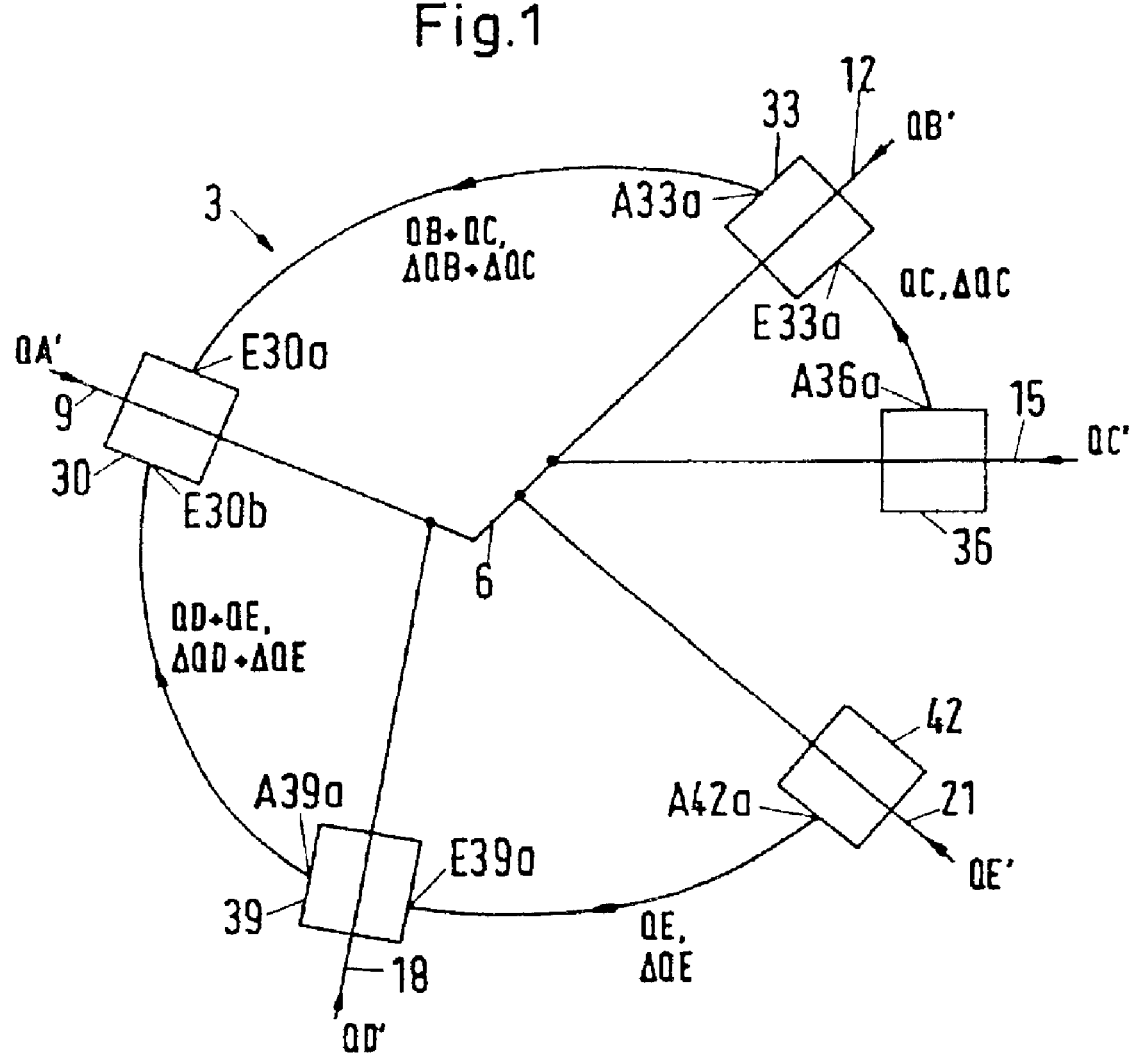
FIG. 1 shows an exemplary embodiment of an arrangement for carrying out the method according to the invention.

FIG. 1 shows an arrangement 3 for monitoring an electrical conductor 6 for a fault current. The electrical conductor 6 has a total of five conductor ends, to be precise a first conductor end 9, a second conductor end 12, a third conductor end 15, a fourth conductor end 18, and a fifth conductor end 21. A charge measurement device is in each case fitted to each of the conductor ends 9, 12, 15, 18 and 21, with the charge measurement devices being connected to one another via data lines—for example optical glass fibers. In this case, a selected first charge measurement device 30 is connected to the first conductor end 9, and a further respective charge measurement device 33, 36, 39 and 42 is connected to the other conductor ends 12, 15, 18 and 21.

Specifically, the measurement value input E30a of the first charge measurement device 30 is connected to a measurement value output A33a of the first further charge measurement device 33—referred for short in the following text as the second charge measurement device 33. At a measurement value input E33a, the second of the further charge measurement devices 36—referred to for short in the following text as the third charge measurement device 36—with its measurement value output A36a is arranged upstream of said second charge measurement device.

The first charge measurement device 30 is also connected by a further measurement value input E30b to a measurement value output A39a of the third of the further charge measurement devices 39—referred to for short in the following text as the fourth charge measurement device 39. At a measurement value input E39a, the fourth of the further charge measurement devices 42—referred to for short in the following text as the fifth charge measurement device 42—with its measurement value output A42a is arranged upstream of the fourth charge measurement device.

The five charge measurement devices 30, 33, 36, 39 and 42 are thus connected to one another in a structure in the form of a chain, with the third charge measurement device 36 and the fifth charge measurement device 42 forming outer charge measurement devices in the chain, and the first charge measurement device 30, the second charge measurement device 33 and the fourth charge measurement device 39 forming inner charge measurement devices in the chain.

The arrangement 3 is used to monitor the electrical conductor 6 for a fault current, in the manner described in the following text.

A clock generator, which is not illustrated, is used to transmit a clock signal $T_A$ to the charge measurement devices. This clock signal $T_A$ ensures that the charge measurement devices determine the amount of charge flowing through their respective conductor end during a predetermined measurement duration synchronously in time in each case, that is to say at the same times.

Once the charge measurement devices have now measured the amounts of charge or charges QA', ..., QE' in their respective conductor ends 9, 12, 15, 18, 21 at one time, the procedure is as follows:

The charge measurement value IC, which corresponds to the charge QC' in the conductor end 15, of the third charge measurement device 36 is emitted at the measurement value output A36a of the third charge measurement device 36, and is transmitted to the measurement value input E33a of the second charge measurement device 33. This second charge measurement device 33 adds to the charge measurement value QB, which corresponds to the charge QB' flowing through its conductor end 12, the charge measurement value QC transmitted from the third charge measurement device 36, forming a sum charge measurement value QC+QB, using a computation unit which is not shown in FIG. 1. This sum charge measurement value QC+QB is transmitted from the second charge measurement device 33 to the first charge measurement device 30.

The fifth charge measurement device 42 at the fifth conductor end 21 as well as the fourth charge measurement device 39 at the fourth conductor end 18 operate in precisely the same way as the second and the third charge measurement devices, that is they each add the charge measurement value from their own charge measurement device to a charge measurement value, which is applied to their measurement value input, from the possibly respectively upstream charge measurement device, taking into account the respective charge flow direction with the correct mathematical sign, and emit the resultant sum charge measurement value at their measurement value output as the measurement value.

A first intermediate value, which includes the charge measurement values QB and QC, is thus passed to the one measurement value input E30a of the first charge measurement device 30, and a second intermediate value, which includes the charge measurement values QE and QD, is passed to the further measurement value input E30b of the first charge measurement device 30.

The first and the second intermediate values as well as the charge measurement value QA which indicates the charge QA' in the conductor end 9 are then used in the first charge measurement device 30 to form an overall charge measurement value by addition. This overall charge measurement value is equal to QA+QB+QC+QD+QE.

The overall charge measurement value QA+QB+ ... +QE is in consequence equal to zero in accordance with Kirchhoff's laws, if no fault current has occurred. If the overall charge measurement value is not equal to zero or if it exceeds a predetermined threshold value, then a fault current has occurred. The expression fault current in this case means a current which flows away at a fault point, for example at a short-circuit point, that is a current which does not flow out of the line 6 at one of the conductor ends 9, 12, 15, 18 or 21, or is not fed into the line 6 there. Both types of fault current are reflected in the overall charge measurement value of the charge measurement device 30, as can be found by comparison of the overall charge measurement value with a threshold value, which is approximately equal to zero. If the overall charge measurement value exceeds the predetermined threshold value, then the charge measurement device 30 produces a fault signal.

Thus, the overall charge measurement value in the selected, first charge measurement device 30 is used, by comparison with the threshold value, to determine whether a fault current has occurred. In this case, by way of example in a direct current system, it is not only possible to find out whether a fault has occurred at all but, in addition, also of course the nature of the fault if, after the comparison of the magnitude of the overall charge measurement value with the predetermined threshold value, the respective mathematical sign of the overall charge measurement value is also evaluated. This is because—depending on its association with a current direction—the mathematical sign indicates whether the fault current has flowed into or out of the line 6.

The threshold value with which the overall charge measurement value QA+ . . . QE is compared may, for example, be predetermined such that it is fixed. However, in order to make it possible to produce fault signals reliably, it is advantageous for the threshold value to be automatically matched to the respective "measurement situation." This can be achieved by the threshold value being matched on a conductor-end specific basis to the accuracy of the charge measurement devices (in particular the accuracy of the associated current transformers, as well). Specifically, the fault signal should thus be formed when the overall charge measurement value QA+ . . . QE is greater than a fixed predetermined minimum threshold Qmin and is greater than an overall system error ΔQdiff. The expression overall system error means an error which is formed by estimating the maximum possible measurement error of the overall measurement arrangement The overall system error ΔQdiff is in this case to be formed from $$\Delta Qdiff_{\text{All charge measurement devices}} = \Sigma \Delta Qdiff_{\text{overall error of the respective charge measurement device}} + \Sigma \Delta Qdiff_{\text{synchronization All connections}}$$

The $\Delta Qdiff_{synchronization}$ term in this case takes into account synchronization errors in synchronization of the charge measurement devices. Errors such as these occur if the charge measurement values are not measured at synchronized times. The $\Delta Qdiff_{overall\ error\ of\ the\ respective\ charge\ measurement\ device}$ term indicates the measurement error of the respective charge measurement device. This measurement error $\Delta Qdiff_{overall\ error\ of\ the\ respective\ charge\ measurement\ device}$ includes two elements, namely:

$$\Delta Qdiff_{\substack{\text{overall error of} \\ \text{the respective} \\ \text{charge measurement} \\ \text{device}}} = \Delta Qdiff_{\text{measurement error}} + \Delta Qdiff_{\text{integration}}$$

where $\Delta Qdiff_{\text{measurement error}} = k \cdot T \cdot \underset{\text{Measurement interval}}{\text{MAX}} \left[ \frac{|i|}{I_{rated}} \right]$ where k is a parameter which indicates the measurement inaccuracy (tolerance) of the respective charge measurement device, T is the length of the measurement interval (measurement window) for the charge measurement, and $$\underset{\text{Measurement interval}}{\text{MAX}} \left[ \frac{|i|}{I_{rated}} \right]$$

indicates the (normalized) maximum current value in the measurement interval, with respect to the rated current $I_{rated}$. $\Delta Qdiff_{measurement\ error}$ thus in this case indicates the proportion of the overall error of the respective charge measurement device which is due to the measurement inaccuracy k in the current measurement; this increases as the current rises as a function of the individual measurement inaccuracy k of the respective charge measurement device.

The term $\Delta Qdiff_{integration}$ in the overall error of the respective charge measurement device takes account of the integration error which occurs depending on the integration method and which may in turn differ on a charge-measurement-device specific basis. The $\Delta Qdiff_{integration}$ term is, of course, relevant when the charge measurement values are obtained from current measurement values by integration.

In order that the overall system error ΔQdiff can be formed in the charge measurement device 30, the charge-measurement-device specific "measurement errors" $\Delta Qdiff_{measurement\ error} + \Delta Qdiff_{integration}$ relating to this are determined, and are transmitted to the charge measurement device 30. The way in which this is done will now be explained in the following text. The following abbreviations are introduced for this purpose:

ΔQA = ΔQdiff measurement error of the charge measurement device 30 + ΔQdiff integration error of the charge measurement device 30

ΔQB = ΔQdiff measurement error of the charge measurement device 33 + ΔQdiff integration error of the charge measurement device 33

ΔQC = ΔQdiff measurement error of the charge measurement device 36 + ΔQdiff integration error of the charge measurement device 36

ΔQD = ΔQdiff measurement error of the charge measurement device 39 + ΔQdiff integration error of the charge measurement device 39

ΔQE = ΔQdiff measurement error of the charge measurement device 42 + ΔQdiff integration error of the charge measurement device 42

In addition to the respective charge measurement value QA, QB, . . . QD, the respective measurement errors ΔQA, ΔQB, ΔQC, ΔQD and ΔQE are thus likewise formed in each of the charge measurement appliances in accordance with the above rules, and are each dealt with in precisely the same way as the respective charge measurement value. Specifically, this means that the third charge measurement device 36 transmits its measurement error ΔQC to the second charge measurement device 33. This adds its own measurement error ΔQB to the received measurement error ΔQC and transmits the measurementerror sum ΔQB+ΔQC to the first charge measurement device 30. In the same way, the first charge measurement device 30 receives the measurement error sum ΔQD+ΔQE formed from the measurement errors of the fourth and fifth charge measurement devices 39 and 42.

The "overall measurement error" $\Delta Q_{overall}$ for the charge measurement devices can then be formed in the first charge measurement device 30 using $$\Delta Q_{overall} \Delta QA + \Delta QB + \Delta QC + \Delta QD + \Delta QE$$

The synchronization error is then added to the overall measurement error $\Delta Q_{overall}$ to form the overall system error $\Delta Q_{diff}$ as follows:

$$\Delta Q_{diff} = \Delta Q_{overall} + \underset{\text{all connections}}{\Sigma \Delta Qdiff_{synchronization}}$$

The calculation of the synchronization error will be explained in conjunction with FIG. 3.

If the overall system error $\Delta Q_{diff}$ is available in the first charge measurement device 30, then the overall charge measurement value QA+ . . . QE is compared with a predetermined minimum threshold value Q and with the overall system error $\Delta Q_{diff}$ and the fault signal is produced if:

$$QA+\ldots QE>Q_{min} \text{ and}$$

$$QA+\ldots QE>\Delta Q_{diff}$$

Figure 2:
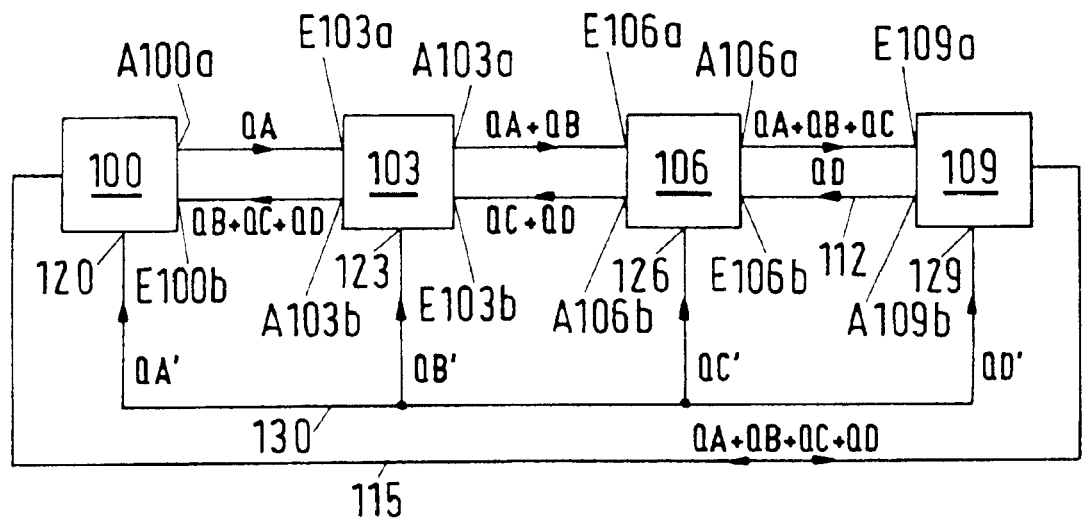
FIG. 2 shows an exemplary embodiment of an arrangement for carrying out the method according to the invention.

FIG. 2 shows a second exemplary embodiment of an arrangement by means of which the method according to the invention can be carried out. This shows charge measurement devices 100, 103, 106 and 109, which are electrically connected to one another by means of data lines 112 in a structure in the form of a chain. In this case, two charge measurement devices, to be precise the charge measurement devices 100 and 109, are located at the outer end of the chain, and two charge measurement devices, to be precise the charge measurement devices 103 and 106, are located in the interior of the chain.

The first inner charge measurement device 103 is connected by its measurement value input E103a to a measurement value output A100a of the charge measurement device 100 arranged upstream from it. The measurement value output A103a of the first inner charge measurement device 103 is followed by a measurement value input E106a of the second inner charge measurement device 106, whose measurement value output A106a is in turn followed by a measurement value input E109a of the second outer charge measurement device 109. The second outer charge measurement device 109 also has a measurement value output A109b, which is connected to a further measurement value input E106b of the second inner charge measurement device 106. This second inner charge measurement device 106 is furthermore connected by a further measurement value output A106b to a further measurement value input E103b of the first inner charge measurement device 103. This first inner charge measurement device 103 is also connected by a further measurement value output A103b to a measurement value input E100b of the first outer charge measurement device 100.

In addition, there is a further data line 115, to be precise a duplex line, between the first outer charge measurement device 100 and the second outer charge measurement device 109.

Each of the charge measurement devices 100, 103, 106 and 109 is furthermore respectively connected to one conductor end of the electrical line 130, which has four conductor ends 120, 123, 126 and 129—indicated schematically in FIG. 2—and measures the charge QA', QB', QC' or QD' flowing through its conductor end, forming charge measurement values QA, QB, QC or QD. In the process, the first outer charge measurement device 100 measures the charge measurement value or the charge measurement values QA at the first conductor end 120, the first inner charge measurement device 103 measures the charge measurement value or the charge measurement values QB at the second conductor end 123, the second inner charge measurement device 106 measures the charge measurement value or the charge measurement values QC at the third conductor end 126, and the second outer charge measurement device 109 measures the charge measurement value or the charge measurement values QD at the fourth conductor end 129.

The arrangement shown in FIG. 2 is operated as follows: the charge measurement value QA measured by the first outer charge measurement device 100 is transmitted via the data line 112 to one measurement value input E103a of the first inner charge measurement device 103. The latter uses its own charge measurement value QB and the measurement value QA from the first outer charge measurement device 100 to form a sum charge measurement value QA+QB, which is transmitted as the measurement value QA+QB to one measurement value input E106a of the second inner charge measurement device 106. The second inner charge measurement device 106 uses the measurement value QA+QB and its own charge measurement value QC to form a new sum charge measurement value QA+QB+QC, which is transmitted as a measurement value to one measurement value input E109a of the second outer charge measurement device 109. This charge measurement device 109 uses the measurementvalue QA+QB+QC and its own charge measurement value QD to form an overall current value QA+QB+QC+QD. The charge measurement device 109 produces a fault signal S for a fault current at a control output, which is not shown, if the overall current value QA+QB+QC+QD exceeds the predetermined minimum threshold value Q and the overall system error $\Delta Q_{diff}$. The overall system error is determined in the same way in this case as that explained in conjunction with FIG. 1, namely taking account of the measurement errors $\Delta QA$, $\Delta QB$, .... $\Delta QD$ which are specific to the charge measurement appliance, and the synchronization error that occurs. In order to allow this, the corresponding measurement errors $\Delta QA$, $\Delta QB$, ... $\Delta QD$ which are specific to the charge measurement appliance are also be transmitted with the charge values QA QB, ... QD, as has been explained in conjunction with FIG. 1, For the sake of clarity, FIG. 2 does not indicate the corresponding reference symbols $\Delta QA$, $\Delta QB$, ... $\Delta QD$.

At the same time, the charge measurement value QD from the second outer charge measurement device 109 is transmitted as a further measurement value to the further measurement value input E106b of the second inner charge measurement device 106. One measurement value QA+QB from the first inner charge measurement device 103 is thus now applied to one measurement value input E106a in the second inner charge measurement device 106, and the further measurement value QD is now available at the further measurement value input E106b. The charge measurement device 106 uses the two measurement values and its own measured charge measurement value QC to form the overall charge measurement value QA+QB+QC+QD, and the fault signal is formed as soon as the overall charge measurement value QA+QB+QC+QD exceeds the predetermined minimum threshold value $Q_{min}$ and the overall system error $\Delta Q_{diff}$; the fault signal S is then emitted at a control output, which is not illustrated. The charge measurement device 106 uses the further measurement value QD, which is applied to the further measurement value input E106b, and its own charge measurement value QC to form a further sum charge measurement value QC+QD as well, which is emitted at the further measurement value output A106b and is transmitted to the first inner charge measurement device 103.

One measurement value QA from the first outer charge measurement device 100 is now applied to one measurement value input E103a in the first inner charge measurement device 103, and the further measurement value QC+QD is now applied to the further measurement value input E103b. The charge measurement device 103 uses the two measurement values QA and QC+QD and its own measured charge measurement value QB to form the overall charge measurement value QA+QB+QC+QD, and the fault signal is formed as soon as the overall charge measurement value QA+QB+QC+QD exceeds the predetermined minimum threshold value Qua and the overall system error $\Delta Q_{diff}$; the fault signal S is then emitted at a control output which is not illustrated. The charge measurement device 103 uses the further measurement value QC+QD which is applied to the further measurement value input E103b and its own charge measurement value QB to form a further sum charge measurement value QB+QC+QD as well, which is emitted at the further measurement value output A103b to the first outer charge measurement device 100.

The measurement value QB+QC+QD from the first inner charge measurement device 103 is now applied to the measurement value input E100b in the first outer charge measurement device 100. The first outer charge measurement device 100 uses the measurement value QB+QC+QD and its own measured charge measurement value QA to form the overall charge measurement value QA+QB+QC+QD, and the fault signal is formed as soon as the overall charge value QA+QB+QC+QD exceeds the predetermined minimum threshold value $Q_{min}$ and the overall system error $\Delta Q_{diff}$; the fault signal S is then emitted at a control output which is not illustrated.

Thus, one measurement value or two measurement values is or are thus transmitted to each of the charge measurement devices, by means of which each of the charge measurement devices is able to use its own charge measurement value to determine the overall charge measurement value and to produce the fault signal.

The overall charge measurement value is in each case transmitted for monitoring purposes via the further data line 115 between the two outer charge measurement devices 100 and 109. For this purpose, a check is carried out in the two charge measurement devices to determine whether the overall charge measurement value transmitted from the respective other outer charge measurement device corresponds to its own overall charge measurement value. If this is not the case, an alarm signal is produced which indicates a fault in the measurement arrangement. A further advantage of the further data line 115 is that the arrangement as shown in FIG. 2 can also still be operated if one data line 112 between two adjacent charge measurement devices is interrupted since, in a situation such as this, the further data line 115 can be used as a replacement for the interrupted data line 112.

The one computation unit and the further computation unit may be formed, for example, by a data processing system or by a microprocessor arrangement.

Figure 3:
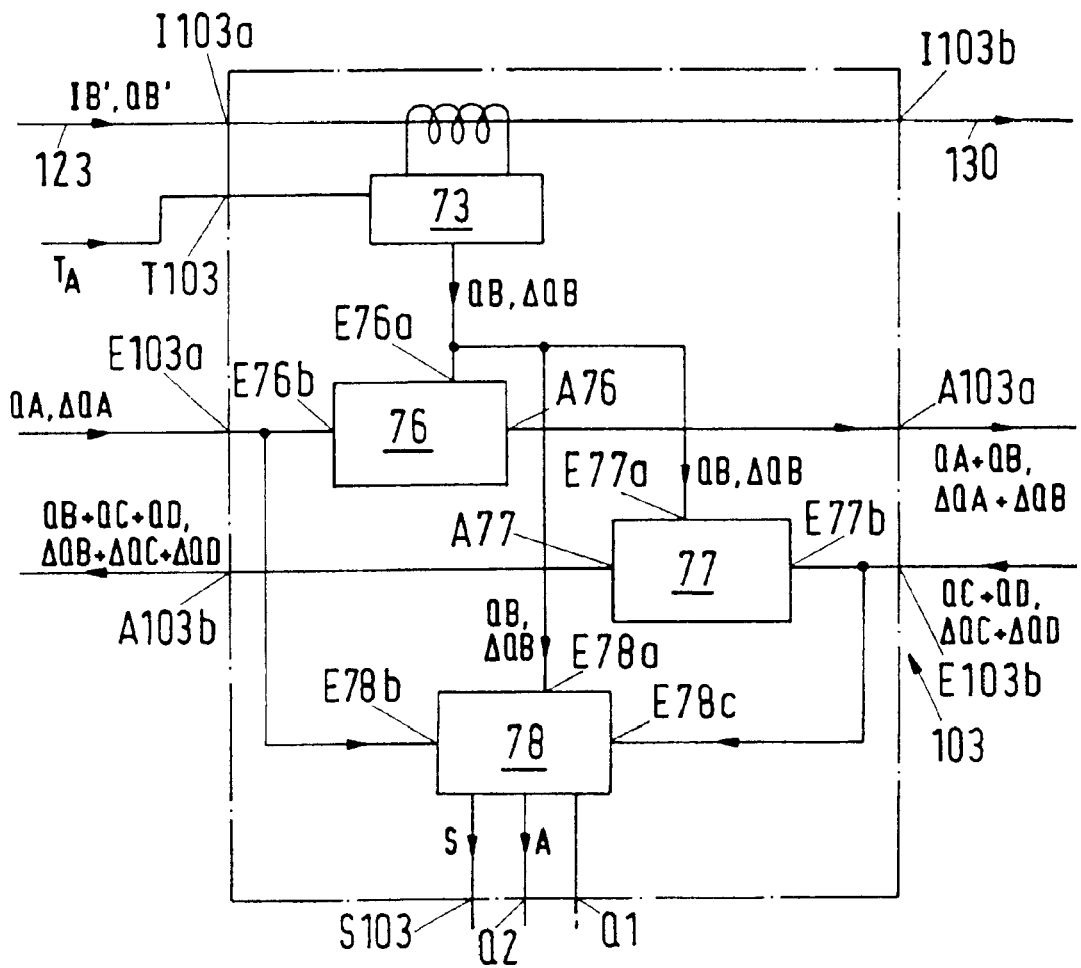
FIG. 3 shows an exemplary embodiment of a charge measurement device for carrying out the method according to the invention.

FIG. 3 shows an exemplary embodiment of a charge measurement device as may be used in the arrangements shown in FIGS. 1 and 2. In this case, the explanation of the charge measurement device 103 is based on FIG. 2 and, to simplify understanding, FIG. 3 uses the same reference symbols as those in FIG. 2 for those components in FIG. 3 which have already been explained in conjunction with FIG. 2.

The charge measurement device 103 has a current input I103a and a further current input I103b, by means of which the charge measurement device 103 is connected to the conductor end 123 of the line 130 as shown in FIG. 2. A measurement unit 73 is connected to the two current inputs I103a and I103b and is followed by an adder element 76 as a computation unit with an input E76a, by a further adder element 77 as a further computation unit with an input E77a, and by a control unit 78 with an input E78a. A further input E76b of the adder element 76 is connected to one measurement value input E103a of the charge measurement device 103, and an output A76 of the adder element 76 is connected to one measurement value output A103a of the charge measurement device 103.

A further input E77b of the further adder element 77 is connected to the further measurement value input E103b of the charge measurement device 103, and an output A77 of the further adder element 77 is connected to the further measurement value output A103b of the charge measurement device 103.

A further input E78b of the control unit 78 is connected to a measurement value input E103a of the charge measurement device 103; an additional measurement value input E78c of the control unit 78 is connected to the further measurement value input E103b of the charge measurement device 103.

The measurement unit 73 is used to measure the current IB' in the conductor end 123, forming a current measurement value IB which corresponds to the current IB'. The current measurement values IB which are formed during a predetermined measurement duration T or during a predetermined measurement window are integrated in the measurement unit 73, forming a charge measurement value QB.

$$QB = \int_{t_0}^{t_1} IB(t)\,dt$$

(t0: measurement window start, t1: measurement window end)

This charge measurement value QB then therefore indicates the charge QB' which has flowed through the conductor end 123 during the measurement duration T=t1−t0.

The measurement duration T, or the length of the measurement window, is in this case $$T = \frac{1}{f} \cdot \frac{1}{4} = 5 \text{ ms}$$

(for a 50 Hz alternating current), where f is the fundamental frequency of the alternating current IB' and may be, for example, 50 Hz or 60 Hz. The charge measurement process is in this case repeated cyclically, with the measurement windows being intended to intersect. Specifically, good results are achieved for production of the fault signal S if the measurement windows are shifted by approximately ⅛ of the period of the alternating current IB' (=45° shift). A 45° shift of the measurement windows thus means that the respective next charge measurement is intended to be carried out at a time in the center of the respectively preceding charge measurement:

$$QB\,(t_0) = \int_{t_0-T/2}^{t_0+T/2} IB(t)\,dt \text{ (previous measurement)}$$

$$QB\,(t_0 + \Delta t) = \int_{t_0}^{t_0+T} IB(t) \text{ (respective next measurement)}$$

where Δt is the time shift between the measurement windows and T is the length of the measurement windows; so that:

$$\Delta t = \frac{T}{2} = 2.5 \text{ ms (at 50 Hz)}$$

This charge measurement value QB formed in this way is passed to the computation unit 76 in which it and a charge measurement value QA at one measurement value input E103a are used to form a sum charge measurement value QA+QB, which is transmitted as a measurement value to one measurement value output A103*a* of the charge measurement device 103.

The charge measurement value QB is also passed to the further computation unit 77, in which the further measurement value QC+QD at the further measurement value input E103*b* of the charge measurement device 103 and the charge measurement value QB are used to form a further sum charge measurement value QB+QC+QD, which is emitted as a measurement value at the further measurement value output A103*b* of the charge measurement device 103.

Furthermore, the charge measurement value QB is transmitted to the control unit 78, which uses its own charge measurement value QB, the one measurement value QA and the further measurement value QC+QD to form an overall charge measurement value QA+QB+QC+QD.

This overall charge measurement value QA+ . . . +QD is compared in the control unit 78 with a threshold value which is matched to the measurement situation. If the overall charge measurement value exceeds this threshold value, then a signal S, which indicates a fault current in the line 130, is emitted at a control signal output S103 of the current measurement device 103. The details of the way in which the comparison with the threshold value is carried out are described in the following text:

The measurement error $\Delta QB$ of the charge measurement device 103 is furthermore formed in the measurement unit 73 using:

$$\Delta QB = k_B \cdot T \cdot \underset{\text{Measurement interval } T}{\text{MAX}} \left[ \frac{|IB|}{I_{rated}} \right] + \Delta Q_{\text{Integration error of the charge measurement devive 103}}$$

where $k_B$ (typically=0.2) indicates the measurement inaccuracy or measurement tolerance of the charge measurement device 103. T is 5 ms, and $I_{rated}$ is a predetermined rated current which is governed by the conductor 6. The integration error depends on the nature of the integration method, and is dependent on the measured current measurement values IB.

The measurement error $\Delta QB$ is passed to the computation unit 76, in which it is added to the measurement error $\Delta QA$ which is present on the input side. The measurement error sum $\Delta QA+\Delta QB$ is emitted at the measurement value output A103*a* of the charge measurement device 103.

The measurement error $\Delta QB$ is also passed to the further adder element 77, in which the measurement value sum $\Delta QC+\Delta QD$ from the measurement value input E103*b* is added to the measurement error $\Delta QB$. The measurement value sum $\Delta QB+\Delta QC+\Delta QD$ is emitted at the further measurement value output A103*b* of the charge measurement device 103.

Furthermore, the measurement error $\Delta QB$ is passed to the control unit 78 in which an overall measurement error $\Delta QA+ . . . +\Delta QD$ is formed by addition of the measurement errors $\Delta QA$, $\Delta QB$, $\Delta QC$ and $\Delta QD$ applied to the input side there.

An overall system error $\Delta Q_{diff}$ is then formed from this overall measurement error in the control unit 78 as follows:

$$\Delta Q_{diff} = \Delta QA + ... \Delta QD + \sum_{\text{all connections}} \Delta Qdiff_{synchronization}$$

where $$\sum_{\text{all connections}} \Delta Qdiff_{synchronization}$$

is a variable which is permanently stored in the control unit 78 and which indicates the error caused by incorrect synchronization between the charge measurement appliances.

$$\sum_{\text{all connections}} \Delta Qdiff_{synchronization}$$

may, however, also be formed in the control unit 78, as follows:

$$\sum_{\text{all connections}} \Delta Qdiff_{synchronization} = k_{sync} \cdot \Delta T_{sync} \cdot (\Delta QA + ... + \Delta QD)$$

where $\Delta T_{synch}$ is the estimated maximum time synchronization error, stored in the control unit 78, between the individual clock signals $T_A$, and where $k_{sync}$ is a factor which may be calculated, by way of example, as follows:

$$k_{sync} = \frac{1}{T \cdot \text{Min}(\text{Measurement inaccuracies of all the charge measurement appliances involved})}$$

If T=5 ms and the minimum measurement inaccuracy (measurement tolerance) of the charge measurement devices (reference symbols 30, 33, 36, 39 and 42 in FIG. 1 and reference symbols 100, 103, 106 and 109 in FIG. 2) which are involved is 0.2, then $k_{sync}$ is thus 1000 1/s.

The fault signal S is subsequently formed if the overall charge measurement value QA+ . . . QD is greater than the fixed predetermined minimum threshold $Q_{min}$ and is greater than the overall system error $\Delta Q_{diff}$.

The current measurement device 103 also has a connection Q1 which is connected to the control unit 78. If the current measurement device 103 is intended to be operated as an outer current measurement device 100 or 109 as shown in FIG. 2, the current measurement device may be connected via this connection Q1 to the respective other outer current measurement device via the further data line 115 for transmission of the overall charge value QA+ . . . +QD. A comparison process is then carried out in the control unit 78 to determine whether its own overall charge value is equal to the transmitted overall charge measurement value from the other outer current measurement device. If this is not the case, an alarm signal A is emitted at a further connection Q2, which indicates that a fault has occurred in the measurement arrangement.

The current measurement device 103 has a clock input T103, by means of which it is connected to a clock generator. The current measurement values IB and the charge measurement values QB are thus formed in synchronism with the other charge measurement devices shown in FIGS. 1 and 2. The clock synchronization may also be carried out in some other way via the data lines, for example via data lines as described in the document cited initially (for example a ping-pong method).

The one computation unit 76 and the further computation unit 77 as well as the control unit 78 may be formed by a data processing system, for example a microprocessor arrangement.

What is claimed is:

1. A method for producing a fault signal characteristic of a fault current in an electrical conductor, the electrical conductor having at least two conductor ends each of which is connected to a respective charge measurement device, comprising:

measuring charge measurement values using the respective charge measurement devices, the charge measurement values indicating an amount of charge which has flowed through the respective conductor end during a predetermined measurement duration;

forming an overall charge measurement value by addition of the respective charge measurement values, taking account of a direction of the charge flow;

weighting a charge measurement value with an individual measurement tolerance of the respective charge measurement device to form a respective measurement error for each of the charge measurement devices; and producing the fault signal if the magnitude of the overall charge measurement value exceeds a threshold value, which is formed as a function of a sum of the respective measurement errors.

2. The method as claimed in claim 1, further comprising:

using the charge measurement devices to form current measurement values by measurement of the current flowing through the respective conductor ends; and forming the charge measurement values by analog or digital integration of the current measurement values formed over the measurement duration.

3. The method as claimed in claim 2, further comprising:

determining the respective maximum current measurement value within the measurement duration for each conductor end;

multiplying the maximum current measurement values by a measurement duration value forming fictional instantaneous maximum charge measurement values, the measurement duration value indicating the measurement duration;

weighting the magnitudes of the respective maximum charge measurement values with the respective individual measurement tolerance to form the respective measurement errors; and selecting the threshold value such that it is at least as great as the sum of the respective measurement errors.

4. The method as claimed in claim 3, further comprising:

forming respective integration errors for each of the charge measurement devices, the respective integration errors occurring due to the integration of the current measurement values;

forming an overall integration error by adding up the respective integration errors;

forming an overall measurement error by addition of the overall integration error to the sum of the respective measurement errors; and selecting the threshold value such that it is at least as great as the overall measurement error.

5. The method as claimed in claim 4, wherein the maximum synchronization error which occurs as a result of incorrect synchronization of the respective charge measurement devices is determined;

the synchronization error is added to the overall measurement error to form an overall system error; and the threshold value is chosen such that it is at least as great as the overall system error.

6. The method as claimed in claim 5, wherein the fault signal is produced if the overall charge measurement value exceeds a fixed predetermined minimum threshold value and the overall system error.

* * * * *